United States Patent [19]
Shirai et al.

[11] 4,273,480
[45] Jun. 16, 1981

[54] THROWAWAY TIP

[75] Inventors: Makoto Shirai; Michinobu Ito; Osamu Kato, all of Nagoya, Japan

[73] Assignee: NGK Spark Plug Co., Ltd., Nagoya, Japan

[21] Appl. No.: 951,816

[22] Filed: Oct. 16, 1978

[30] Foreign Application Priority Data

Oct. 17, 1977 [JP] Japan .......................... 52/138842[U]

[51] Int. Cl.³ ............................................. B26D 1/00
[52] U.S. Cl. .................................................. 407/114
[58] Field of Search ................ 407/114, 115, 116, 100

[56] References Cited

U.S. PATENT DOCUMENTS

| 3,381,349 | 5/1968 | Newcomer | 407/114 |
| 3,885,281 | 5/1975 | Stambler | 407/114 |
| 3,947,937 | 4/1976 | Hertel | 407/116 |
| 3,973,308 | 8/1976 | Lunderen | 407/116 |
| 4,059,363 | 11/1977 | Romagnolo | 407/114 |

Primary Examiner—Leonidas Vlachos
Attorney, Agent, or Firm—Sughrue, Rothwell, Mion, Zinn and Macpeak

[57] ABSTRACT

A throwaway tip for use in a lathe cutting tool. The tip has a cutting edge along the outer periphery and a succession of recesses are formed on the cutting surface. The recesses form a chip curling and cutting mechanism irrespective of the driving direction of the tip. The recesses may be of uniform diameter or preferably increase toward the center of the cutting edge line. The recesses may also be bevelled to facilitate entry and cutting of the chips.

10 Claims, 9 Drawing Figures

U.S. Patent Jun. 16, 1981 Sheet 2 of 2 4,273,480
F I G. 5
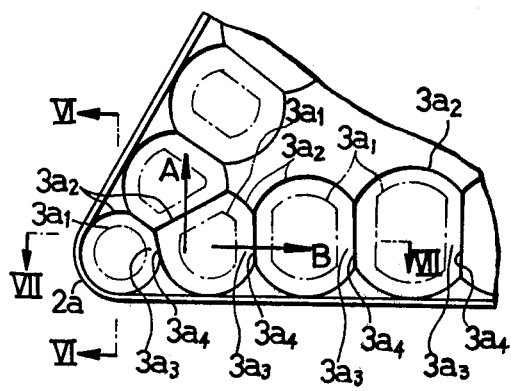
F I G. 6
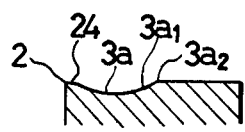
F I G. 7
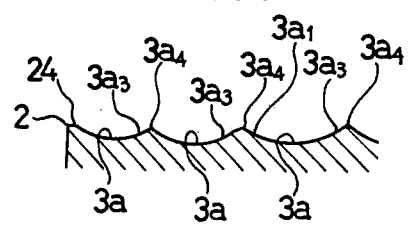
F I G. 8
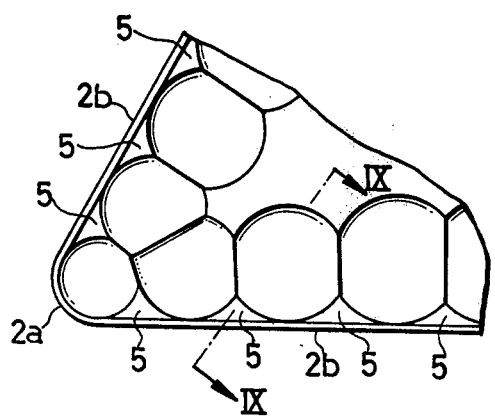
F I G. 9
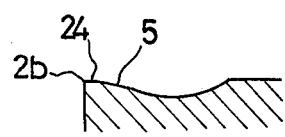

THROWAWAY TIP

BACKGROUND OF THE INVENTION

This invention relates to a throwaway tip of a cutting tool having chip breaker groove for use in lathe turning.

As shown in FIG. 1, the throwaway tip 11 is generally of triangular shape and is fixedly secured to a shank 20 through a shaft 22 and a washer 21. The shank 20, the shaft 22 and the washer 21 are in combined form defining a holder 23 as shown in FIG. 1.

A conventional throwaway tip having chip breaker grooves is shown in FIG. 2. A groove 13 is uniformly formed along a cutting edge 12 of a tip 11. When the tip is driven toward the longitudinal direction, that is, toward the axial direction of a main shaft of a lathe to uniformly cut the outer diameter of the work-piece along its length, a chip is advanced along the transverse direction of the groove 13, so that the chip is cut at the groove edge portion 13a. On the other hand, when the tip is driven toward the transverse direction of the main shaft of the lathe for stepped portion machining or end surface machining of the work-piece, the chip is advanced in parallel with the groove, so that a continuous chip results which tends to clog around the cutting tool. It is troublesome to remove the clogged chip from the cutting tool, particularly in high speed machining.

Further, in the case of a conventional throwaway tip, since the cross sectional area of the groove is relatively large, the contacting area between the tip and the holder 23 is small. This results in difficulty insuring tight fix of the tip to the shank 20 of the holder 23. Furthermore, the cutting edge 12 and a particularly a land portion 24, the portion adjacent thereto, are apt to be damaged by chips.

SUMMARY OF THE INVENTION

It is therefore an object of this invention to overcome the above mentioned drawbacks and to provide an improved throwaway tip having chip breaker grooves which ensures cutting of the chip in various machining conditions.

Briefly, and in accordance with the present invention, a plurality of spherical recesses having a predetermined radius are positioned adjacent the bevelled edge lines. In a preferred embodiment the radius of curvature of the recesses is smallest at the node or corner portions of the tip and then gradually increases toward the center of each edge line. This allows chips that are formed to be effectively curled and then cut. In another embodiment the flat surfaces between recesses are inclined from the edge lines to the recesses. This permits a smooth introduction of the chip into the recess.

This invention will be described with respect to the drawings and the description of the preferred embodiment that follows.

BRIEF DESCRIPTION OF THE DRAWINGS

In the drawings,

FIG. 5 shows a partial enlarged view of FIG. 4;

FIG. 6 shows a cross-sectional view taken along the line VI—VI in FIG. 5;

FIG. 7 shows a cross-sectional view taken along the line VII—VII in FIG. 5;

FIG. 8 shows a plan view of the throwaway tip according to the second embodiment of the present invention; and FIG. 9 shows a cross-sectional view taken along the line IX—IX in FIG. 8.

DETAILED DESCRIPTION OF THE PREFERRED EMBODIMENTS

Figure 1:
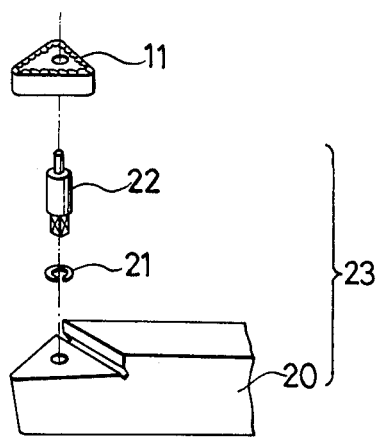
FIG. 1 shows a perspective view showing the assembly of the cutting tool having a throwaway tip.
Figure 2:
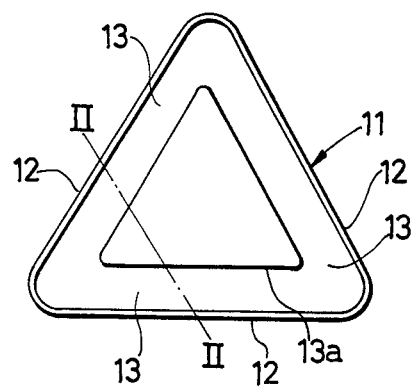
FIG. 2 shows a plan view of a prior art throwaway tip.
Figure 3:
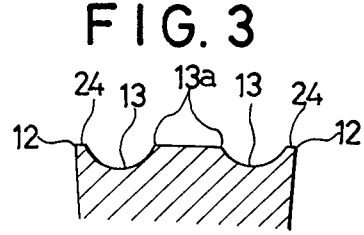
FIG. 3 shows a cross-sectional view taken along the line II—II in FIG. 2.
Figure 4:
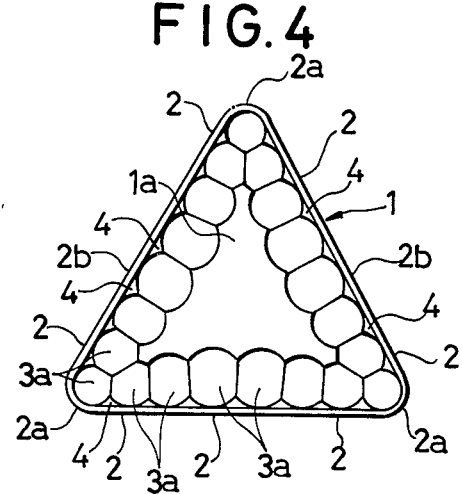
FIG. 4 shows a plan view of the throwaway tip according to the first embodiment of the present invention.

Referring now to the drawings and initially to FIG. 4, reference numeral 1 designates a triangular main body of a throwaway tip made of thermal and wear resistant materials such as cermet, ceramic and super alloy. Roundish nodes $2a$ are provided in an upper surface $1a$ which functions as a tool face and bevelled edge lines $2b$ connected between the nodes are utilized as cutting edges 2. Breaker grooves are formed in the tool face $1a$ in a novel manner along the cutting edges 2 to divide the chip into short pieces.

According to the present invention, a plurality of sub-divided spherical recesses $3a$ each having a predetermined radius of curvature are mutually superimposed at the part thereof to provide ridge lines as shown in the drawings or contacting at the part thereof not shown in the drawings. Each of the recesses may have the same radius of curvature. However, preferably, the radius of the curvature is the smallest at the nose portions $2a$ and gradually increase toward the center of each of the edge lines $2b$ in order to permit effective separation of the chip in various machining conditions. Hence a groove formed along the cutting edge is established.

For example, where the cutting amount (tip advancing rate) is small to create a thin chip, the chip is effectively curled and divided into small pieces by the recessed portion having a small radius of curvature. In the case where the tip advancing rate is large creating thick chips, these chips are effectively divided into small pieces by the recessed portions having a large radius of curvature positioned adjacent central portion of the cutting-edge 2.

Referring now to FIG. 5, in lathe turning i.e., in machining the outer diameter of a workpiece along the longitudinal direction thereof, the cutting tool is driven in a direction parallel to the workpiece. In this case, the chip is discharged in a direction opposite to the direction of tip travel. The chip selectively enters into the recessed portion of the breaker grooves formed by the recesses according to the thickness of the chip in a direction shown by an arrow A. The chip is then curled by a curved surface $3a_1$ positioned opposite to the edge line $2b$, and is cut by a ridge line $3a_2$ formed by the intersection between the recesses and flat surface upon departing from the surface $3a_1$.

On the other hand, in facing, i.e., in machining an end surface or stepped portion of the workpiece by transverse advancement of the tip, the chip is discharged in a direction opposite to the tip advancing direction. That is, the chip selectively enters into the recessed portion $3a$ in response to the thickness of the chip in a direction shown by an arrow B. The chip is then curled by a curved surface $3a_3$ and is cut by the ridge line $3a_4$ defined by the intersection between the neighbouring recesses upon departing from the surface $3a_3$.

Additionally, the chip created by taper turning or curved face turning can be cut by the outer edges $3a_2$ $3a_4$ and the side surface $3a_1$ $3a_3$ as shown in FIGS. 5 and 7.

In this embodiment, the braker grooves are formed in a tool face along the entire cutting edges to facilitate two sided cutting. However, the chip breaker groove can be formed along the single cutting edge alone if desired. Alternatively, the bottom surface of the tool face can be provided with breaker grooves to provide the throwaway tip with two cutting edges along a single edge line.

Furthermore, as shown in FIG. 4, tool face of the main body 1 of the tip is provided with a plurality of small flat portions 4 to increase areas of flat surface portions to thereby provide a large contacting area between the tip and a tip seat of a shank. Hence the tip is fixedly secured thereto in a stabilized manner. The small flat portions 4 reinforce the cutting edge line 2b, so that even if the chip strikes against the edge line during machining, the edge will not be damaged.

The cross-sectional shape of the recessed portions can be formed in circular, oval, parabola, or other arcuate curves. Further, it is preferrable that the curvature of the recessed portion positioned adjacent the node $2a$ is larger than that of the recess positioned apart therefrom, and the depth of the recess positioned adjacent the node is smaller than that of the recess positioned apart therefrom for a wide applicability of the tip. However, the curvature and the depth of the recess can be selectively determined by the workpiece.

A second embodiment of the present invention is shown in FIGS. 8 and 9, wherein like parts and components are designated by the same reference numerals and characters as those shown in the first embodiment. According to the second embodiment, flat surfaces 5 defined between the neighbouring recesses and the edge lines 2b are inclined downwardly and inwardly. This permits smooth introduction of the chip into the recesses to thereby ensure cutting thereof.

It is apparent that modifications of this invention are possible without departing from the essential scope of the invention.

We claim:

1. In a throwaway tip for use in a lathe cutting tool, having a cutting edge formed about the periphery of the tip and a chip breaker groove formed on a surface, the improvement comprising, said breaker groove formed by a plurality of generally spherical recesses disposed adjacent said cutting edge and contacting each other.

2. The tip of claim 1 wherein said recesses are formed with a predetermined radius of curvature whereby the radius of curvature defines an area of overlap between adjacent recesses.

3. The tip of claim 2 wherein said tip is generally triangular and said radius of curvature for each recess increases from apex portions of said tip to a central portion of said cutting edge for each side of the triangle.

4. The tip of claims 1 or 3 further comprising a surface inclined downwardly from the cutting edge to said recesses.

5. The tip of claims 1, 2, or 3 wherein said recesses are generally circular arcuate curves.

6. The tip of claim 5 further comprising a surface inclined downwardly from the cutting edge to said recesses.

7. The tip of claims 1, 2 or 3 wherein said recesses are formed as oval arcuate shapes.

8. The tip of claims 1, 2 or 3 wherein said recesses are formed as parabolic shapes.

9. In a throwaway generally triangular tip for use in a lathe cutting tool, having a cutting edge formed about the periphery of said tip and a chip breaker groove formed on a surface, the improvement comprising, said breaker groove formed by overlapping dimpled recesses extending about the circumference of said triangular tip, each of said recesses having an outer curved surface adjacent said cutting edge.

10. The tip of claim 9, wherein said tip is generally triangular and said radius of curvature for each recess increases from apex portions of said tip to a central portion of said cutting edge for each side of the triangle.

* * * * *